(12) United States Patent
Handa et al.

(10) Patent No.: US 12,448,045 B2
(45) Date of Patent: Oct. 21, 2025

(54) VEHICLE STEERING ASSIST DEVICE

(71) Applicant: TOYOTA JIDOSHA KABUSHIKI KAISHA, Toyota (JP)

(72) Inventors: Satoshi Handa, Kariya (JP); Shusaku Sugamoto, Toyota (JP); Satoshi Inoue, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 18/526,221

(22) Filed: Dec. 1, 2023

(65) Prior Publication Data

US 2024/0253695 A1 Aug. 1, 2024

(30) Foreign Application Priority Data

Jan. 27, 2023 (JP) .................................. 2023-011039

(51) Int. Cl.
*B62D 15/02* (2006.01)
*B62D 5/04* (2006.01)
*B62D 6/00* (2006.01)

(52) U.S. Cl.
CPC ......... *B62D 15/025* (2013.01); *B62D 5/0421* (2013.01); *B62D 5/046* (2013.01); *B62D 6/00* (2013.01); *B62D 15/024* (2013.01)

(58) Field of Classification Search
None
See application file for complete search history.

(56) References Cited

U.S. PATENT DOCUMENTS

| 7,266,436 B2* | 9/2007 | Shirato | B62D 1/286 |
| | | | 348/148 |
| 9,669,866 B2* | 6/2017 | Kunihiro | B62D 5/0481 |
| 9,802,645 B2* | 10/2017 | Kudo | B62D 6/008 |
| 10,046,802 B2* | 8/2018 | Inoue | B60T 8/1755 |
| 10,167,013 B2* | 1/2019 | Kunihiro | B62D 15/025 |
| 10,649,454 B2* | 5/2020 | Kunihiro | B62D 15/0255 |
| 11,173,901 B2* | 11/2021 | Okano | B60W 10/20 |
| 11,718,341 B2* | 8/2023 | Kunihiro | B62D 1/046 |
| | | | 701/41 |

(Continued)

FOREIGN PATENT DOCUMENTS

| CN | 101868396 A | * 10/2010 | ........... B62D 5/0481 |
| CN | 101868396 B | * 8/2013 | ............. B62D 5/008 |

(Continued)

*Primary Examiner* — Kevin R Steckbauer
(74) *Attorney, Agent, or Firm* — SoraIP, Inc.

(57) ABSTRACT

A vehicle steering assist device includes a steering assist ECU. The steering assist ECU calculates a target steering angle for driving the vehicle along the road, and a target steering guide torque that guides the driver's steering so that the actual steering angle becomes the target steering angle. The steering assist ECU controls the torque applying device so that the steering guide torque becomes the target steering guide torque. The steering assist ECU acquires at least one of information on the driving environment of the vehicle and information on the state of the driver, and calculates an index value indicating the necessity of the steering guide torque based on at least one of the pieces of information. The steering assist ECU corrects the target steering guide torque based on the index value so that the higher the need for the steering guide torque, the larger the target steering guide torque.

3 Claims, 4 Drawing Sheets

(56) References Cited

U.S. PATENT DOCUMENTS

| | | | | |
|---|---|---|---|---|
| 11,801,891 | B2 * | 10/2023 | Zegelaar | B62D 15/0265 |
| 12,084,136 | B2 * | 9/2024 | Sugamoto | B60W 30/12 |
| 12,139,196 | B2 * | 11/2024 | Ono | B62D 6/007 |
| 12,240,448 | B2 * | 3/2025 | Handa | B60W 40/02 |
| 12,269,470 | B2 * | 4/2025 | Fukuchi | B60W 50/08 |
| 2003/0213641 | A1 * | 11/2003 | Nakano | B62D 6/008 |
| | | | | 180/446 |
| 2005/0154514 | A1 * | 7/2005 | Niessen | B62D 6/008 |
| | | | | 701/41 |
| 2005/0240328 | A1 * | 10/2005 | Shirato | B62D 1/286 |
| | | | | 701/1 |
| 2007/0265751 | A1 * | 11/2007 | Tsuchiya | B62D 5/0463 |
| | | | | 701/41 |
| 2012/0197496 | A1 * | 8/2012 | Limpibunterng | B62D 1/286 |
| | | | | 701/42 |
| 2013/0190988 | A1 * | 7/2013 | Limpibunterng | B62D 5/008 |
| | | | | 701/42 |
| 2015/0225015 | A1 * | 8/2015 | Takeda | B62D 6/008 |
| | | | | 701/41 |
| 2015/0266504 | A1 * | 9/2015 | Kunihiro | B62D 5/0463 |
| | | | | 701/41 |
| 2016/0297439 | A1 * | 10/2016 | Inoue | B60W 10/184 |
| 2017/0066476 | A1 * | 3/2017 | Kudo | B62D 5/0463 |
| 2017/0088166 | A1 * | 3/2017 | Kunihiro | B62D 6/002 |
| 2017/0088174 | A1 * | 3/2017 | Inoue | B62D 6/003 |
| 2018/0181132 | A1 * | 6/2018 | Kunihiro | G05D 1/0088 |
| 2018/0281848 | A1 * | 10/2018 | Zegelaar | B62D 15/024 |
| 2018/0319424 | A1 * | 11/2018 | Giersiefer | B62D 6/10 |
| 2019/0322311 | A1 * | 10/2019 | Aoki | B62D 6/008 |
| 2019/0367082 | A1 | 12/2019 | Sugamoto et al. | |
| 2020/0005553 | A1 * | 1/2020 | Eyerman | G07C 5/006 |
| 2020/0031344 | A1 * | 1/2020 | Okano | B62D 1/286 |
| 2021/0354748 | A1 * | 11/2021 | Kunihiro | B62D 6/007 |
| 2022/0289173 | A1 * | 9/2022 | Matsuda | B60W 40/13 |
| 2022/0379883 | A1 * | 12/2022 | Bruno | B60W 30/0956 |
| 2022/0396310 | A1 * | 12/2022 | Hamaguchi | B62D 6/008 |
| 2023/0008425 | A1 * | 1/2023 | Sugamoto | B60W 30/0956 |
| 2023/0023426 | A1 * | 1/2023 | Hamaguchi | B62D 15/025 |
| 2023/0202465 | A1 * | 6/2023 | Handa | B60W 10/20 |
| | | | | 701/41 |
| 2023/0278630 | A1 * | 9/2023 | Ono | B62D 6/007 |
| | | | | 701/41 |
| 2023/0311862 | A1 * | 10/2023 | Fukuchi | B60W 10/20 |
| | | | | 701/41 |
| 2023/0347970 | A1 * | 11/2023 | Saigo | B62D 5/0463 |
| 2024/0034408 | A1 * | 2/2024 | Suzuki | B62D 15/025 |
| 2024/0174290 | A1 * | 5/2024 | Hamaguchi | B62D 6/008 |
| 2024/0253695 | A1 * | 8/2024 | Handa | B62D 15/024 |
| 2024/0343260 | A1 * | 10/2024 | Kunihiro | B60W 60/001 |
| 2024/0343304 | A1 * | 10/2024 | Miyawaki | B62D 15/025 |
| 2024/0383528 | A1 * | 11/2024 | Sugamoto | B62D 6/002 |

FOREIGN PATENT DOCUMENTS

| | | | | | |
|---|---|---|---|---|---|
| CN | 104973125 | A | * | 10/2015 | G08G 1/16 |
| CN | 113002522 | A | * | 6/2021 | B60W 30/04 |
| CN | 110382264 | B | * | 8/2022 | B60W 10/22 |
| CN | 113682367 | B | * | 7/2023 | B62D 5/0463 |
| CN | 118215617 | A | * | 6/2024 | B62D 6/04 |
| CN | 118405189 | A | * | 7/2024 | B62D 6/00 |
| CN | 119037403 | A | * | 11/2024 | B60W 10/20 |
| DE | 102007061900 | A1 | * | 6/2009 | B62D 15/025 |
| DE | 102016205523 | A1 | * | 10/2016 | B60W 10/20 |
| EP | 3998188 | A1 | * | 5/2022 | B60W 10/20 |
| EP | 4253196 | A1 | * | 10/2023 | B62D 15/0265 |
| EP | 3808623 | B1 | * | 5/2024 | B60T 7/22 |
| EP | 3562702 | B1 | * | 2/2025 | B60K 7/0007 |
| FR | 3104107 | A1 | * | 6/2021 | B60W 60/0015 |
| JP | 2006-131072 | A | | 5/2006 | |
| JP | 2007-133873 | A | | 5/2007 | |
| JP | 2011-020666 | A | | 2/2011 | |
| JP | 2016199115 | A | * | 12/2016 | B60W 10/184 |
| JP | 2019-209844 | A | | 12/2019 | |
| JP | 2020114710 | A | * | 7/2020 | |
| JP | 2022176475 | A | * | 11/2022 | |
| JP | 2023149555 | A | * | 10/2023 | B62D 15/0265 |
| JP | 2024106661 | A | * | 8/2024 | B62D 6/00 |
| JP | 7603683 | B2 | * | 12/2024 | B60W 30/0956 |
| WO | WO-2021110377 | A1 | * | 6/2021 | B60W 60/0015 |

* cited by examiner

VEHICLE STEERING ASSIST DEVICE

CROSS-REFERENCE TO RELATED APPLICATION

This application claims priority to Japanese Patent Application No. 2023-011039 filed on Jan. 27, 2023 incorporated herein by reference in its entirety.

BACKGROUND

1. Technical Field

The present disclosure relates to a steering assist device and a steering assist method for a vehicle such as an automobile.

2. Description of Related Art

As a steering assist device for a vehicle such as an automobile, there is known a steering assist device that prompts a driver to perform an optimum steering operation. This device obtains the optimum steering angle for the vehicle to travel along the road, and controls the steering reaction force to make the steering angle easily match the optimum steering angle.

For example, Japanese Unexamined Patent Application Publication No. 2019-209844 (JP 2019-209844 A) below describes a steering assist device. This device obtains a target steering angle for the vehicle to travel along the road, and controls the steering device so that a steering guide torque is generated to make the actual steering angle easily match the target steering angle.

When a steering input member such as a steering wheel is steered to a position other than a neutral position, a return torque for urging the steering input member to the neutral position is generated by the steering device. The steering guide torque corrects the return torque so that the magnitude of the return torque is reduced in a region where the magnitude of the steering angle is smaller than the magnitude of the target steering angle. In contrast, the steering guide torque corrects the return torque so that the magnitude of the return torque is increased in a region where the magnitude of the steering angle is larger than the magnitude of the target steering angle. The correction amount of the return torque increases as the magnitude of the difference between the steering angle and the target steering angle increases within a range in which the magnitude of the difference between the steering angle and the target steering angle is equal to or smaller than a predetermined reference value.

According to the steering assist device as described above, the return torque acting as the steering assist force is reduced by the steering guide torque in a region where the magnitude of the steering angle is smaller than the magnitude of the target steering angle. This reduces the ease of steering back so that the steering angle deviates from the target steering angle. Further, in a region where the magnitude of the steering angle is larger than the magnitude of the target steering angle, the return torque acting as the steering reaction force is increased by the steering guide torque. This makes it difficult to further perform steering so that the steering angle deviates from the target steering angle. Therefore, it is possible to prompt the driver to steer so that the steering angle becomes the target steering angle. It is possible to perform steering assistance such that the driver's steering amount becomes an optimum steering amount while maintaining the driver's sense of taking the lead in steering.

The magnitude of the steering guide torque required to make the actual steering angle easily match the target steering angle varies depending on the driving environment of the vehicle and the state of the driver. For example, when the width of the road is small, it is preferable that the magnitude of the steering guide torque is greater than the magnitude of the steering guide torque when the width of the road is wide. When the driver is fatigued, it is preferable that the magnitude of the steering guide torque is greater than the magnitude of the steering guide torque when the driver is not fatigued.

However, in the conventional steering assist device as described above, the steering guide torque is uniquely determined by the difference between the actual steering angle and the target steering angle. Therefore, the magnitude of the steering guide torque cannot be changed in accordance with the driving environment of the vehicle and the state of the driver.

It is conceivable to provide an adjusting device operated by the driver and change the magnitude of the steering guide torque in accordance with the operation of the adjusting device. However, in that case, the driver must operate the adjustment device one by one, which inevitably bothers the driver.

SUMMARY

The present disclosure provides a steering assist device that assists steering using a steering guide torque while maintaining the driver's sense of taking the lead in steering. This device is improved so that the magnitude of the steering guide torque can be automatically and appropriately changed without bothering the driver.

The present disclosure provides a vehicle steering assist device (100) that is applied to a vehicle (80) including a steering input member (steering wheel 14) with which a driver performs a steering operation, a steering device (10) that steers a steered wheel (16FR, 16FL) in accordance with a steering operation amount applied to the steering input member, a torque applying device (electric power steering (EPS) electronic control unit (ECU) 40, electric power steering device 12) that applies torque to the steering input member, and a control unit (steering assist ECU 50) that controls the torque applying device. The control unit is configured to calculate a target steering angle ($\theta t$) for causing the vehicle to travel along a roadway based on a degree of curvature of the roadway acquired by a degree-of-curvature acquiring device (camera sensor 52, navigation device 70, steering assist ECU 50) that acquires the degree of curvature of the roadway in front of the vehicle (S14), calculate a target steering guide torque (Tsgt) for guiding steering performed by the driver such that an actual steering angle ($\theta$) matches the target steering angle based on a deviation between the target steering angle and the actual steering angle (S10), and control the torque applying device such that a steering guide torque matches the target steering guide torque (S80).

The control unit (steering assist ECU 50) is configured to acquire at least one of information of a traveling environment of the vehicle and information of a state of the driver, calculate an index value (Kd, Kr, Ki, and Ka) indicating necessity of the steering guide torque based on the at least one of the information of the traveling environment of the vehicle and the information of the state of the driver (S40 to S70), and correct the target steering guide torque based on the index value such that the target steering guide torque increases as the necessity of the steering guide torque increases (S80).

Further, to the present disclosure provides a steering assist method that is applied to a vehicle (80) including a steering input member (steering wheel 14) with which a driver performs a steering operation, a steering device (10) that steers a steered wheel (16FR, 16FL) in accordance with a steering operation amount applied to the steering input member, and a torque applying device (EPS ECU 40, electric power steering device 12) that applies a steering guide torque to the steering input member, and the steering assist method includes the steps of: calculating a target steering angle (θt) for causing the vehicle to travel along a roadway based on a degree of curvature of the roadway acquired by a degree-of-curvature acquiring device (camera sensor 52, navigation device 70, steering assist ECU 50) that acquires the degree of curvature of the roadway in front of the vehicle (S14); calculating a target steering guide torque (Tsgt) for guiding steering performed by the driver such that an actual steering angle (θ) matches the target steering angle based on a deviation between the target steering angle and the actual steering angle (S10); and controlling the torque applying device such that a steering guide torque matches the target steering guide torque (S80).

The steering assist method further includes the steps of: acquiring at least one of information of a traveling environment of the vehicle and information of a state of the driver, and calculating an index value (Kd, Kr, Ki, and Ka) indicating necessity of the steering guide torque based on the at least one of the information of the traveling environment of the vehicle and the information of the state of the driver (S40 to S70); and correcting the target steering guide torque based on the index value such that the target steering guide torque increases as the necessity of the steering guide torque increases (S80).

According to the steering assist device and the steering assist method described above, the at least one of the information about the traveling environment of the vehicle and the information about the state of the driver is acquired. The index value indicating the necessity of the steering guide torque is calculated based on the at least one of the information of the traveling environment of the vehicle and the information of the state of the driver. The target steering guide torque is corrected based on the index value such that the target steering guide torque increases as the necessity of the steering guide torque increases.

Therefore, the target steering guide torque is automatically corrected such that the target steering guide torque increases as the necessity of the steering guide torque increases. Accordingly, it is possible to automatically and appropriately change the magnitude of the steering guide torque in accordance with the at least one of the driving environment of the vehicle and the state of the driver, without bothering the driver.

In one aspect of the present disclosure, the control unit (steering assist ECU 50) may be configured to calculate a difficulty level (Dd) of a driving operation performed by the driver based on the information of the traveling environment of the vehicle, and calculate the index value (Kd) based on the difficulty level of the driving operation such that the index value increases as the difficulty level of the driving operation increases (S40).

According to the above aspect, the index value (Kd) is calculated such that the index value increases as the difficulty level of the driving operation increases. Accordingly, it is possible to correct the target steering guide torque such that the target steering guide torque increases as the difficulty level of the driving operation increases.

In the aspect of the present disclosure, the control unit (steering assist ECU 50) may be configured to calculate a probability of danger avoidance steering (Rs) based on the information of the traveling environment of the vehicle, and calculate the index value (Kr) based on the probability of danger avoidance steering such that the index value increases as the probability of danger avoidance steering increases (S50).

According to the above aspect, the index value (Kr) is calculated such that the index value increases as the probability of danger avoidance steering increases. Accordingly, it is possible to automatically and appropriately correct the target steering guide torque such that the target guide torque increases as the probability of the danger avoidance steering increases.

In another aspect of the present disclosure, the control unit (steering assist ECU 50) may be configured to calculate an instability level (Id) of the driver based on the information of the state of the driver, and calculate the index value (Ki) based on the instability level of the driver such that the index value increases as the instability level of the driver increases (S60).

According to the above aspect, the index value (Ki) is calculated such that the index value increases as the instability level of the driver increases. Accordingly, it is possible to automatically and appropriately correct the target steering guide torque such that the target steering guide torque increases as the instability level of the driver increases.

Other objects, other features and accompanying advantages of the present disclosure will be readily understood from the description of embodiments of the present disclosure described with reference to the following drawings.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiments of the present disclosure will be described in detail below with reference to the accompanying drawings.

Embodiment

Figure 1:
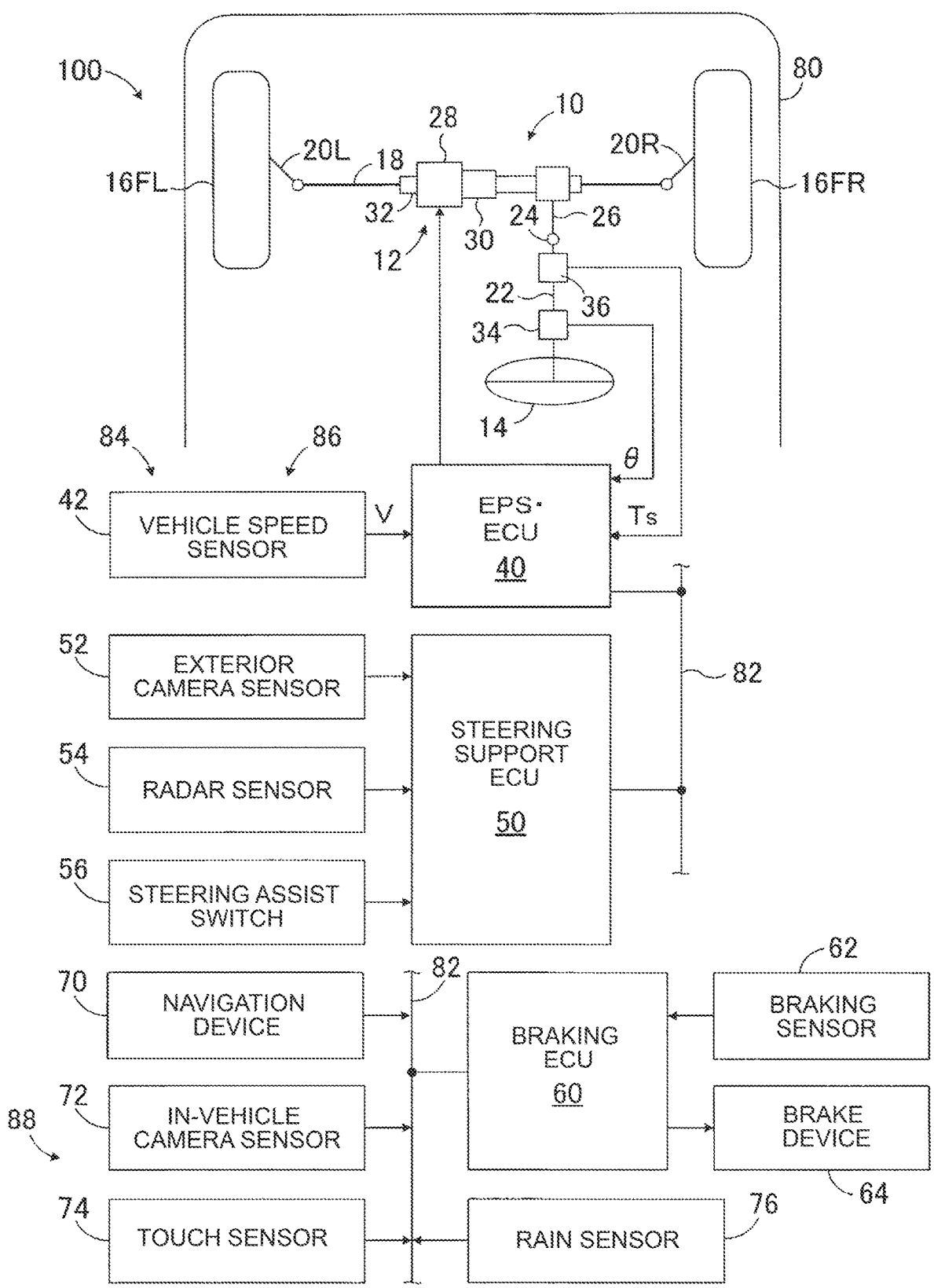
FIG. 1 is a schematic configuration diagram showing an embodiment of a steering assist device according to the present disclosure.

A steering assist device 100 according to the embodiment is applied to a vehicle 80 having a steering device 10, an electric power steering ECU 40, a steering assist ECU 50, and a braking ECU 60, as shown in FIG. 1. In this specification, electric power steering is referred to as EPS as needed.

The EPS ECU 40, the steering assist ECU 50, and the braking ECU 60 are Electronic Control Units having a microcomputer as a main part, and are connected via a Controller Area Network (CAN) 82 so as to be able to transmit and receive information to each other. Each of the microcomputers includes a central processing unit (CPU), a read-only memory (ROM), a random access memory (RAM), a non-volatile memory, an interface, and the like. The CPU realizes various functions by executing instructions (programs, routines) stored in the ROM. These ECUs may be integrated into one ECU.

As shown in FIG. 1, the steering device 10 includes an EPS device 12. The EPS device 12 is configured as a rack-and-pinion electric power steering system driven in response to the driver's operation of the steering wheel 14. The rack bar 18 of the EPS device 12 to connected to knuckle arms (not shown) of front wheels 16FR, 16FL via tie rods 20R, 20L. The steering wheel 14 is connected to a pinion shaft 26 of the EPS device 12 via a steering shaft 22 and a universal joint 24.

When the vehicle 80 turns, self-aligning torque acts on the front wheels 16FL and 16FR, which are steered wheels. The self-aligning torque is transmitted to steering wheel 14 via steering device 10. Accordingly, the steering wheel 14 is acted upon by a return torque Tre (a return torque when a basic assist torque Tba described later is not generated) that urges the steering wheel 14 toward the neutral position, that is, the straight running position of the vehicle. The self-aligning torque increases as the steering angle of the front wheels increases, and increases as the vehicle speed V increases.

Assuming that the steering angle $\theta$, which is the rotation angle of the steering wheel 14, becomes positive when the vehicle 80 turns to the right, and the return torque Tre becomes positive when it acts in the counterclockwise direction, the magnitude of the return torque Tre is, increases as the absolute value of the steering angle $\theta$ increases. The rate of increase of the return torque Tre decreases as the absolute value of the steering angle $\theta$ increases. Further, the magnitude of the return torque Tre increases as a vehicle speed V increases.

In the illustrated embodiment, the EPS device 12 is a rack coaxial type electric power steering device, and includes an electric motor 28 and a ball screw type conversion mechanism 30 that converts a rotational torque of the electric motor 28 into a force in the reciprocating direction of the rack bar 18, for example. The EPS device 12 generates a basic assist torque Tba by driving the rack bar 18 relative to the housing 32. Therefore, the magnitude of the return torque Trea when the basic assist torque Tba is generated is smaller than the magnitude of the return torque Tre.

The EPS device 12 functions as a controlled steering torque generator that generates a control steering torque Tsc that corrects the return torque Trea. As will be described later in detail, the control steering torque Tsc includes the target steering guide torque Tsgt. The magnitude of the target steering guide torque Tsgt is approximately one-tenth the magnitude of the return torque Trea. The steering guide torque Tsg corresponding to the target steering guide torque Tsgt acts as a torque to promote the driver's steering such that the actual steering angle $\theta$ becomes the target steering angle $\theta t$, that is, the target value of the steering angle for causing the vehicle 80 to travel along the road.

Note that the steering guide torque Tsg acts in a direction to suppress the steering when the driver performs further steering so that the actual steering angle $\theta$ is separated from the target steering angle $\theta t$. Further, the steering guide torque Tsg acts in the direction of decreasing the return torque when the driver performs the return steering such that the actual steering angle $\theta$ is separated from the target steering angle $\theta t$.

The steering assist ECU 50 calculates a target basic assist torque Tbat, which is the target value of the basic assist torque Tba, and a target steering guide torque Tsgt, which is the target value of the steering guide torque Tsg. Signals indicating the calculated target basic assist torque Tbat, target steering guide torque Tsgt, and target steering angular velocity control torque Tavt are supplied to the EPS device 12. The target basic assist torque Tbat may be calculated in any manner known in the art as a target value of the basic assist torque Tba that reduces the return torque Tre to the return torque Trea. Calculation of the target steering guide torque Tsgt will be described later.

A signal indicating the vehicle speed V detected by the vehicle speed sensor 42 is input to the EPS ECU 40. The EPS ECU 40 calculates a target steering assist torque Tsat for reducing the driver's steering burden based on the steering torque Ts and the vehicle speed V in a manner known in the art. The EPS ECU 40 controls the EPS device 12 so that the control steering torque Tsc generated by the EPS device 12 becomes the sum Tbat+Tsgt+Tsat of the target basic assist torque Tbat, the target steering guide torque Tsgt and the target steering assist torque Tsat. Note that the control steering torque Tsc may include a target steering angular velocity control torque for suppressing the steering angular velocity $\theta d$ from becoming excessive.

As will be described in detail later, when the steering assist switch 56 is off, the target steering guide torque Tsgt is not calculated. Therefore, the EPS ECU 40 controls the EPS device 12 so that the control steering torque Tsc generated by the EPS device 12 becomes the sum of the target basic assist torque Tbat and the target steering assist torque Tsat, Tbat+Tsat.

Further, the EPS device 12 may have any configuration known in the art as long as it can generate a control steering torque Tsc that is the sum of the target basic assist torque Tbat, the target steering guide torque Tsgt and the target steering assist torque Tsat. For example, the EPS device 12 may be a rack-assisted type or column-assisted type electric power steering device that is not a rack coaxial type.

The steering shaft 22 is provided with a steering angle sensor 34 that detects the steering angle $\theta$, that is, the rotation angle of the steering shaft 22, and a steering torque sensor 36 that detects the steering torque Ts. A signal indicating the steering angle $\theta$ detected by the steering angle sensor 34 and a signal indicating the steering torque Ts detected by the steering torque sensor 36 are also input to the EPS ECU 40. The steering angle sensor 34 and the steering torque sensor 36 detect the steering angle $\theta$ and the steering torque Ts, respectively, with positive values detected when the vehicle 80 turns right.

As shown in FIG. 1, the steering assist ECU 50 is connected with an exterior camera sensor 52, a radar sensor 54 and a steering assist switch 56. Camera sensor 52 and radar sensor 54 include multiple camera devices and multiple radar devices, respectively. At least part of the vehicle speed sensor 42, the camera sensor 52, etc. may be connected to another ECU such as the CAN 82 or the EPS ECU 40.

Each camera device of the vehicle exterior camera sensor 52 includes, although not shown in the figure, a camera unit that photographs the surroundings of the vehicle 80, and a recognition unit that analyzes the image data obtained by photographing by the camera unit and recognizes objects such as detect other vehicles and pedestrians. The recognition unit supplies information about the recognized object to the steering assist ECU 50 at predetermined intervals.

Each radar device of the radar sensor 54 radiates radio waves in the millimeter wave band and receives radio waves (that is, reflected waves) reflected by three-dimensional objects (for example, other vehicles, bicycles, etc.) within the radiation range. Furthermore, each radar device calculates the distance between the vehicle and the three-dimensional object, The steering assist ECU 50 is supplied with information indicating the relative speed between the vehicle and the three-dimensional object, the direction of the three-dimensional object with respect to the own vehicle, and the like at predetermined intervals. Note that Light Detection And Ranging (LiDAR) may be used instead of the radar sensor 54 or in addition to the radar sensor 54.

The steering assist switch 56 is operated by the driver and supplies a signal to the steering assist ECU 50 indicating whether it is on. When the steering assist switch 56 is on, the steering assist ECU 50 calculates a target steering angle $\theta t$ for causing the vehicle 80 to travel along the road as described later, and the actual steering angle $\theta$ becomes the target steering angle $\theta t$. A target steering guide torque Tsgt for guiding the driver's steering is calculated so that Furthermore, although not shown in FIG. 1, the steering assist switch 56 includes a control mode changeover switch that is operable when it is on. The steering assist switch 56 sets the control mode to the auto mode when the switch is set to auto. The steering assist switch 56 sets the control mode to the manual mode when the selector switch is set to the manual mode. In the auto mode, the gain Ka is automatically variably set as described later. In the manual mode, the gain Ka is manually variably set by the driver. The gain Ka is a gain for changing the magnitude of the target steering guide torque Tsgt. This will be explained in detail later.

The braking ECU 60 is connected to a braking sensor 62 that detects the master cylinder pressure or the force applied to the brake pedal as a driver's braking operation amount, and a braking device 64 that decelerates the vehicle 80 by braking by applying braking force to the wheels. The braking ECU 60 normally controls the braking device 64 so that the braking force generated by the braking device 64 changes according to the amount of braking operation by the driver detected by the braking sensor 62. Further, when the braking ECU 60 receives a command signal from another ECU, the braking ECU 60 performs automatic braking by controlling the braking device 64 based on the command signal.

A navigation device 70, an in-vehicle camera sensor 72, a touch sensor 74 and a rain sensor 76 are connected to the CAN 82. At least part of the navigation device 70, the in-vehicle camera sensor 72, etc. may be connected to another ECU such as the steering assist ECU 50.

The navigation device 70 includes a GPS receiver that detects the position of the vehicle 80, a storage device that stores map information and road information, and a communication device that acquires the latest map information and road information from the outside. The navigation device 70 also outputs road information to the steering assist ECU 50 in addition to information such as the position and direction of travel of the vehicle on the map.

The in-vehicle camera sensor 72 photographs the vehicle cabin of the vehicle, and supplies the image data of the driver's upper body obtained by the photographing to the steering assist ECU 50 at predetermined intervals. Therefore, the in-vehicle camera sensor 72 functions as a driver monitor camera.

A touch sensor 74 is provided on the steering wheel 14 and supplies a signal to the steering assist ECU 50 indicating whether the driver is gripping the steering wheel with both hands or one hand.

The rain sensor 76 detects raindrops adhering to the outer surface of the windshield glass (not shown) and functions as a rain sensor for the front wipers. The rain sensor 76 outputs a signal indicating the presence or absence of raindrops and the amount of raindrops to the steering assist ECU 50.

As will be described later, the vehicle speed sensor 42, the vehicle exterior camera sensor 52, the navigation device 70, and the rain sensor 76 function as a sensor 84 that acquires information on the vehicle driving environment for calculating the driving task difficulty level Dd. The driving task difficulty level Dd is an index value indicating the difficulty of driving the vehicle 80 by the driver. The driving task difficulty level Dd increases as the difficulty of driving increases.

The vehicle speed sensor 42, the vehicle exterior camera sensor 52, the radar sensor 54, and the navigation device 70 function as a sensor 86 that acquires information on the vehicle's driving environment for calculating the probability of danger avoidance steering Rs. The probability of danger avoidance steering Rs is an index value indicating the probability of steering to avoid danger such as collision with an obstacle on the road. The probability of danger avoidance steering Rs increases as the probability of performing risk avoidance steering increases.

Further, the steering angle sensor 34, the in-vehicle camera sensor 72, and the touch sensor 74 function as a sensor 88 that acquires information about the driver's state for calculating the instability level Id of the driver. The instability level Id of the driver is an index value indicating the instability of driving of the vehicle 80 by the driver and the possibility of destabilization. The instability level Id of the driver increases as the risk of driving instability and instability increases.

Calculation of Target Steering Guide Torque Tsgt

Figure 2:
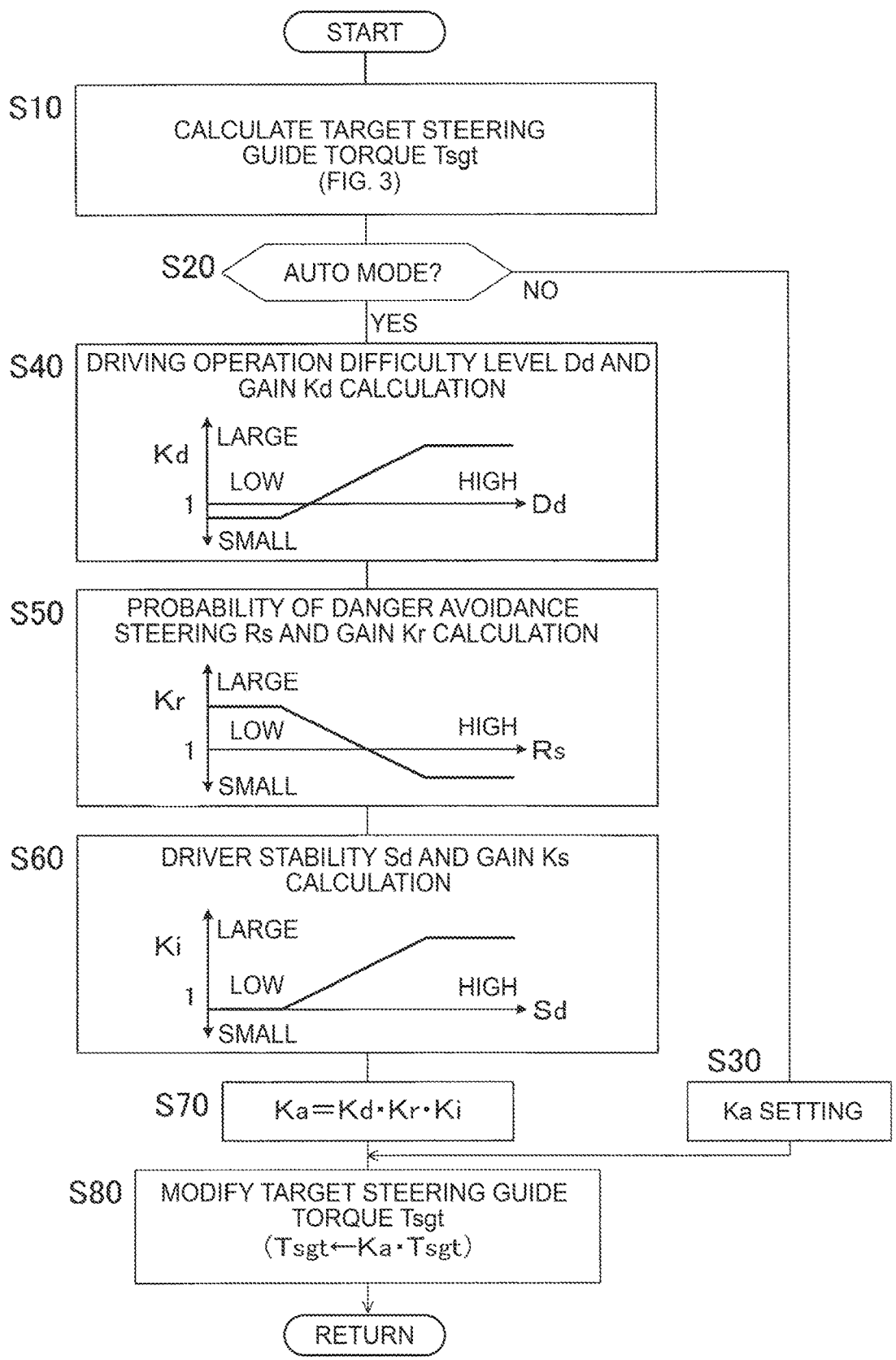
FIG. 2 is a flowchart showing a control routine for calculating and correcting the target steering guide torque Tsgt in the embodiment.

Next, a calculation and correction routine for the target steering guide torque Tsgt in the embodiment will be described with reference to the flowchart shown in FIGS. 2 and 3. In the following description, the control for calculating and correcting the target steering guide torque Tsgt according to the flowchart shown in FIGS. 2 and 3 is simply referred to as main control.

2 and 3 are executed by the CPU of the steering assist ECU 50 when the flowchart switch (not shown) and the steering assist switch 56 are on. Executed repeatedly every hour.

Figure 3:
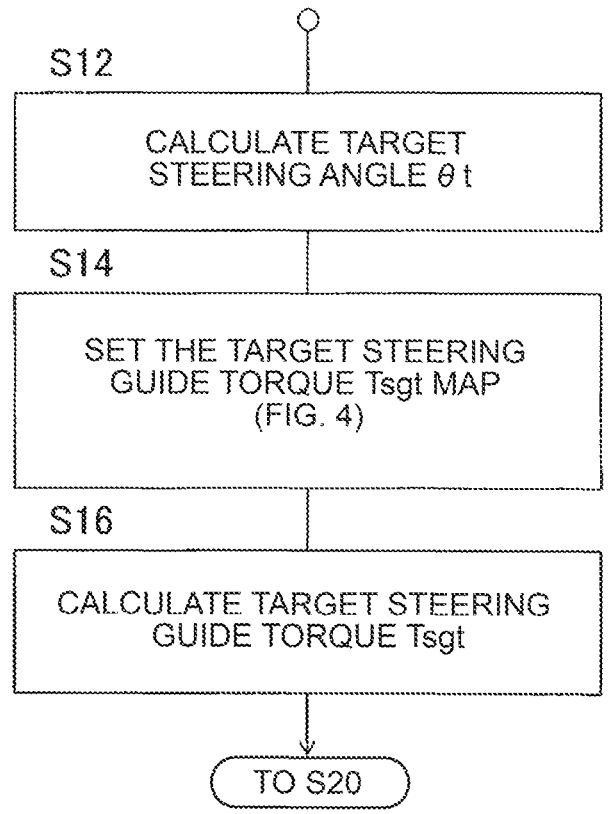
FIG. 3 is a flowchart showing a subroutine for target steering guide torque Tsgt calculation executed in S10 of FIG. 2.

First, in S10, the CPU calculates the target steering guide torque Tsgt according to the subroutine shown in FIG. 3.

In S20, the CPU determines whether the control mode is the auto mode. When the CPU makes an affirmative determination, the control proceeds to S40. When the CPU makes a negative determination, the control proceeds to S30.

In S30, the CPU sets the gain Ka, which is used in calculating the target steering guide torque Tsgt in S80, to a value specified by the driver's operation of the steering assist switch 56. When the steering assist switch 56 is not operated by the driver, the gain Ka is set to a preset standard value such as 1, for example.

In S40, the CPU calculates the difficulty level Dd of the driving operation based on the vehicle speed V, the image captured by the exterior camera sensor 52, the information from the navigation device 70, and the amount of rain detected by the rain sensor 76. The difficulty level Dd of the driving operation is calculated so as to increase as the vehicle speed V increases and as the amount of rainfall increases. Further, the difficulty level Dd of the driving operation is calculated so as to be higher as the radius of the curve of the travel road is smaller, and to be higher as the width of the travel road is smaller. The difficulty level Dd of the driving operation is calculated so as to be higher when there is a following vehicle than when there is no following vehicle. Furthermore, the difficulty level Dd of the driving operation is calculated so as to be high when the driving road is an unpaved road or a winding road, and to be low when the driving road is an expressway or an automobile-only road.

Furthermore, in S40, the CPU sets the gain Kd to a positive value smaller than 1 when the difficulty level Dd of the driving operation is low. The CPU sets the gain Kd to a positive value greater than 1 when the difficulty level Dd of the driving operation is high. Furthermore, when the difficulty level Dd of the driving operation is an intermediate value, the CPU sets the gain Kd so that it increases as the difficulty level Dd of the driving operation increases.

In S50, the CPU calculates the probability of danger avoidance steering Rs based on the vehicle speed V, the image captured by the exterior camera sensor 52, the information on the three-dimensional object detected by the radar sensor 54, and the information from the navigation device 70. The probability of danger avoidance steering Rs is calculated so as to increase as the vehicle speed V increases. Further, the probability of danger avoidance steering Rs is calculated so as to be higher as the number of traffic participants other than automobiles such as pedestrians and bicycles increases. The probability of danger avoidance steering Rs is calculated so as to be higher when there is a vehicle parked on the road than when there is no vehicle parked on the road. Furthermore, the probability of danger avoidance steering Rs is calculated so as to be higher when the driving area is an urban area than when the driving area is a suburban area.

Further, in S50, the CPU sets the gain Kr to a positive value larger than 1 when the probability of danger avoidance steering Rs is low. The CPU sets the gain Kr to a positive value smaller than 1 when the probability of danger avoidance steering Rs is high. Furthermore, when the probability of danger avoidance steering Rs is an intermediate value, the CPU sets the gain Kr so that the higher the probability of danger avoidance steering Rs, the smaller the gain Kr.

In S60, the CPU calculates the instability level Id of the driver based on the steering angle θ, the image captured by the in-vehicle camera sensor 72, and the driver's gripping state of the steering wheel 14 detected by the touch sensor 74. The instability level Id is calculated so as to increase as the fluctuation of the steering angle θ increases. The instability level Id is calculated so as to increase as the driving duration of the driver increases. Further, the instability level Id is calculated so as to be higher when the driver grips the steering wheel 14 with one hand than when the driver grips the steering wheel 14 with both hands. Further, the instability level Id is calculated based on the driver's upper half body image so that the degree of fatigue of the driver is determined to be higher, the higher the instability level Id. The instability level Id is calculated based on the face image of the driver so that it increases as the driver's eye-opening rate is determined to be lower.

Further, in S60, the CPU sets the gain Ki to 1 when the instability level Id is low. The CPU sets the gain Ki to a positive value greater than 1 when the instability level Id is high. Furthermore, when the instability level Id is an intermediate value, the CPU sets the gain Ki so that it increases as the instability level Id increases.

In S70, the CPU sets the gain Ka to the product of the gains Kd, Kr and Ki set in S40 to S40. Gains Kd, Kr, Ki and Ka are index values indicating the necessity of steering guide torque. It may be considered that the larger these values are, the higher the need for the steering guide torque is. In particular, the gains Kd and Kr are index values obtained based on information on the running environment of the vehicle 80. The gain Ki is an index value obtained based on information about the driver's condition. The gain Ka is an index value that comprehensively indicates the necessity of the steering guide torque.

In S70, the CPU controls the gain Ka so that it does not exceed a preset upper limit guard value (positive constant greater than 1) and a preset lower limit guard value (positive constant less than 1). The gain Ka is guarded so that it does not become smaller.

In S80, the CPU corrects the target steering guide torque Tsgt to the product of the gain Ka and the target steering guide torque Tsgt. Furthermore, the CPU outputs a signal indicating the target steering guide torque Tsgt to the EPS ECU 40.

As shown in FIG. 3, in S12, the CPU causes the target steering angle θt for the vehicle 80 to travel along the curve of the travel road, for example, in the manner of S50 to S80 in FIG. 3 described in Japanese Unexamined Patent Application Publication No. 2022-176475 (JP 2022-176475 A) Note that the target steering angle θt may be calculated in any manner known in the art.

Figure 4:
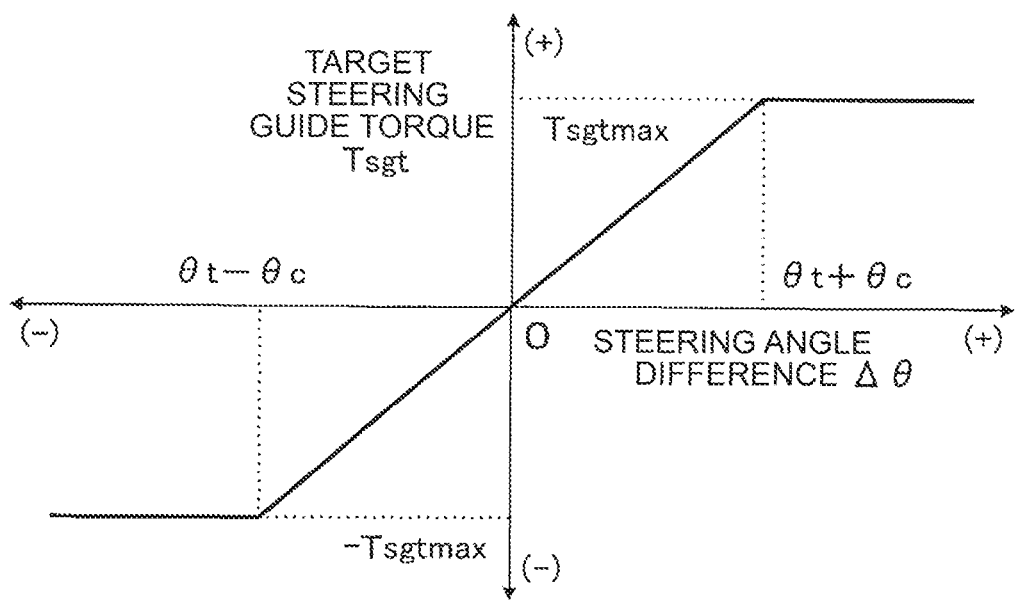
FIG. 4 is a map showing the relationship between the steering angle deviation Δθ and the target basic steering guide torque Tsgt.

In S14, the CPU determines a map of the target steering guide torque Tsgt so that the target steering guide torque Tsgt becomes 0 when the steering angle θ is the target steering angle θt, as shown in FIG. 4. As described above, the magnitude of the target steering guide torque Tsgt is the steering angle deviation when the deviation Δθ (=θ−θt) between the steering angle θ and the target steering angle θt is greater than θt−θc and less than θt+θc. It increases as Δθ increases. Furthermore, the target steering guide torque Tsgt becomes a constant value of −Tsgtbmax when the steering angle deviation Δθ is equal to or less than θt−θc. The target steering guide torque Tsgt becomes a constant value of Tsgtbmax when the steering angle deviation Δθ is equal to or greater than θt+θc. The reference value θc is a positive constant.

In S16, the CPU calculates the target steering guide torque Tsgt by referring to the map determined in S115 based on the steering angle deviation Δθ, which is the deviation θ−θt between the steering angle θ and the target steering angle θt. Calculate.

Figure 5:
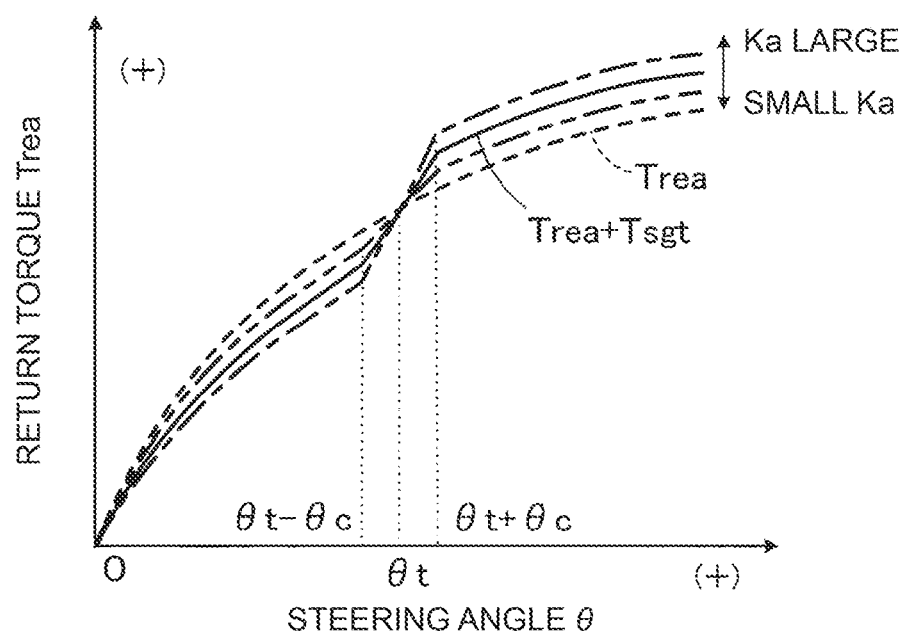
FIG. 5 is a diagram showing the relationship between the steering angle θ, the gain Ka, and the return torque Trea.

FIG. 5 shows the return torque in the region where the steering angle θ is positive, and the broken line and the solid line respectively indicate the return torque Trea and the return torque Trea corrected by the target steering guide torque Tsgt, that is, Trea+Tsgt. The return torque line in the region where the steering angle θ is negative is point-symmetrical to the return torque line in the region where the steering angle θ is positive with respect to the origin.

As can be seen from FIG. 5, the target steering guide torque Tsgt corrects the return torque so that the return torque Trea is reduced in a region where the magnitude of the steering angle θ is smaller than the magnitude of the target steering angle θt. Conversely, the target steering guide torque Tsgt corrects the return torque so that the return torque Trea is increased in a region where the magnitude of the steering angle θ is greater than the magnitude of the target steering angle θt. In the range where the difference between the steering angle and the target steering angle is equal to or less than a preset reference value θc, the correction amount of the return torque Trea is the difference θ−θt between the steering angle and the target steering angle. The bigger it gets, the bigger it gets.

Furthermore, as can be seen from FIG. 5, the magnitude of the target steering guide torque Tsgt increases as the gain Ka increases. Therefore, the magnitude of the return torque Trea corrected by the target steering guide torque Tsgt decreases as the gain Ka increases in a region where the magnitude of the steering angle θ is smaller than the magnitude of the target steering angle θt. Conversely, the magnitude of the return torque Trea corrected by the target steering guide torque Tsgt increases as the gain Ka increases in a region where the magnitude of the steering angle θ is greater than the magnitude of the target steering angle θt.

As can be seen from the above description, according to the embodiment, information about the driving environment of the vehicle and information about the state of the driver are acquired. A gain Ka as an index value indicating the necessity of the steering guide torque Tsgt is calculated based on these pieces of information (S40 to S70). Further, the target steering guide torque is corrected based on the gain Ka so that the higher the need for the steering guide torque, the larger the target steering guide torque (S80).

Therefore, the target steering guide torque can be automatically corrected so that the magnitude of the target steering guide torque Tsgt increases as the need for the steering guide torque increases. Therefore, the magnitude of the steering guide torque can be automatically and appropriately changed in accordance with the driving environment of the vehicle and the state of the driver without the driver feeling annoyed.

In particular, according to the embodiment, the difficulty level Dd of the driver's driving operation is calculated based on the information on the driving environment of the vehicle. A gain Kd as an index value is calculated based on the difficulty level of the driving operation so that it increases as the difficulty level of the driving operation increases (S40). The gain Ka is calculated so as to increase as the gain Kd increases (S70). Therefore, the magnitude of the target steering guide torque Tsgt can be automatically changed so that it increases as the difficulty level Dd of the driving operation increases.

Further, according to the embodiment, the probability of danger avoidance steering Rs g is calculated based on the information of the driving environment of the vehicle. A gain Kr as an index value is calculated based on the probability of the danger avoidance steering so that it increases as the probability of the danger avoidance steering increases (S50). The gain Ka is calculated so as to increase as the gain Kr increases (S70). Therefore, the magnitude of the target steering guide torque Tsgt can be automatically changed so that the higher the probability of danger avoidance steering Rs is, the larger the target steering guide torque Tsgt is.

Furthermore, according to the embodiment, the instability level Id of the driver is calculated based on the information about the driving environment of the vehicle. A gain Ki as an index value is calculated based on the degree of instability of the driver so that it increases as the degree of instability of the driver increases (S60). The gain Ka is calculated so as to increase as the gain Ki increases (S70). Therefore, the magnitude of the target steering guide torque Tsgt can be automatically changed so that it increases as the instability level Id of the driver increases.

Furthermore, according to the above-described embodiment, when the probability of danger avoidance steering Rs is high, the gain Kr is calculated to a value smaller than 1 (S50), and the magnitude of the steering guide torque is reduced. Therefore, compared to the case where the gain Kr is not calculated to be a value smaller than 1, it is possible to reduce the risk that the steering guide torque will interfere with the driver's steering to avoid danger.

Although the present disclosure has been described in detail with respect to specific embodiments, the present disclosure is not limited to the embodiments described above. Various other embodiments are possible within the scope of the present disclosure.

For example, in the above-described embodiment, the gain Ka of the target steering guide torque Tsgt is the gain Kd (S40) based on the difficulty level Dd of the driving operation, the gain Kr (S50) based on the probability of danger avoidance steering Rs, and the driver's It is the product of the gain Ki (S60) based on the instability level Id of the driver (S70). However, at least one of gains Kd, Kr and Ki may be omitted.

Further, in the above-described embodiment, the reference value θc is constant regardless of whether the gain Ka is increased or decreased. However, the reference value θc may be variably set according to the gain Ka so that it increases as the gain Ka increases and decreases as the gain Ka decreases.

In the above-described embodiment, the steering device 10 is a steering device including the electric power steering device 12 in which the steering wheel 14 and the left and right front wheels 16FL, 16FR are mechanically connected. However, the vehicle steering assist device according to the present disclosure may be applied to a vehicle in which the steering device is a steer-by-wire type steering device. When the steering device is a steer-by-wire type steering device, the return torque Trea after the modification may be generated by an actuator that applies a steering reaction force to the steering wheel.

Furthermore, in the above-described embodiment, the steering input member is the rotationally operated steering wheel 14, but it may be, for example, a pivotally operated joystick type steering input member.

What is claimed is:
1. A vehicle steering assist device that is applied to a vehicle including a steering wheel with which a driver performs a steering operation, a steering device that steers a steered wheel in accordance with a steering operation amount applied to the steering wheel, a torque applying device that applies torque to the steering wheel, and a processor that controls the torque applying device, wherein:
the processor is configured to
calculate a target steering angle for causing the vehicle to travel along a roadway based on a degree of curvature of the roadway acquired by a degree-of-curvature acquiring device that acquires the degree of curvature of the roadway in front of the vehicle,
calculate a target steering guide torque for guiding steering performed by the driver such that an actual steering angle matches the target steering angle based on a deviation between the target steering angle and the actual steering angle, and control the torque applying device such that a steering guide torque matches the target steering guide torque; and the processor is configured to acquire information of a traveling environment of the vehicle, calculate a difficulty level of a driving operation performed by the driver based on the information of the traveling environment of the vehicle so as to increase (i) as a vehicle speed increases, (ii) as an amount of rainfall increases, (iii) as a radius of a curve of the roadway is smaller, (iv) as a width of the roadway is smaller, calculate an index value indicating necessity of the steering guide torque based on the difficulty level of the driving operation such that the index value increases as the difficulty level of the driving operation increases, and correct the target steering guide torque based on the index value such that the target steering guide torque increases as the necessity of the steering guide torque increases.

2. A vehicle steering assist device that is applied to a vehicle including a steering wheel with which a driver performs a steering operation, a steering device that steers a steered wheel in accordance with a steering operation amount applied to the steering wheel, a torque applying device that applies torque to the steering wheel, and a processor that controls the torque applying device, wherein:

the processor is configured to calculate a target steering angle for causing the vehicle to travel along a roadway based on a degree of curvature of the roadway acquired by a degree-of-curvature acquiring device that acquires the degree of curvature of the roadway in front of the vehicle, calculate a target steering guide torque for guiding steering performed by the driver such that an actual steering angle matches the target steering angle based on a deviation between the target steering angle and the actual steering angle, and control the torque applying device such that a steering guide torque matches the target steering guide torque; and the processor is configured to acquire information of a traveling environment of the vehicle, calculate a probability of danger avoidance steering based on the information of the traveling environment of the vehicle so as to increase as a vehicle speed increases and as a number of pedestrians increases, calculate an index value indicating necessity of the steering guide torque based on the probability of danger avoidance steering such that the index value increases as the probability of danger avoidance steering increases, and correct the target steering guide torque based on the index value such that the target steering guide torque increases as the necessity of the steering guide torque increases.

3. A vehicle steering assist device that is applied to a vehicle including a steering wheel with which a driver performs a steering operation, a steering device that steers a steered wheel in accordance with a steering operation amount applied to the steering wheel, a torque applying device that applies torque to the steering wheel, and a processor that controls the torque applying device, wherein:

the processor is configured to calculate a target steering angle for causing the vehicle to travel along a roadway based on a degree of curvature of the roadway acquired by a degree-of-curvature acquiring device that acquires the degree of curvature of the roadway in front of the vehicle, calculate a target steering guide torque for guiding steering performed by the driver such that an actual steering angle matches the target steering angle based on a deviation between the target steering angle and the actual steering angle, and control the torque applying device such that a steering guide torque matches the target steering guide torque; and the processor is configured to acquire information of a state of the driver, calculate an instability level of the driver based on the information of the state of the driver so as to increase as a fluctuation of the actual steering angle increases and as a driving duration of the driver increases, calculate an index value indicating necessity of the steering guide torque based on the instability level of the driver such that the index value increases as the instability level of the driver increases, and correct the target steering guide torque based on the index value such that the target steering guide torque increases as the necessity of the steering guide torque increases.

* * * * *